(12) United States Patent
Morse et al.

(10) Patent No.: US 7,028,201 B2
(45) Date of Patent: Apr. 11, 2006

(54) POWERING-UP A DEVICE HAVING DIGITAL AND ANALOG CIRCUITRY

(75) Inventors: Douglas C. Morse, Hillsboro, OR (US); Edward E. Miller, Beaverton, OR (US); Edward A. Ramsden, Hillsboro, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 32 days.

(21) Appl. No.: 10/794,498

(22) Filed: Mar. 5, 2004

(65) Prior Publication Data

US 2005/0198547 A1 Sep. 8, 2005

(51) Int. Cl.
*G06F 1/30* (2006.01)
*H03L 7/00* (2006.01)

(52) U.S. Cl. .................. 713/330; 327/142; 327/143
(58) Field of Classification Search ................ 713/330, 713/300, 340; 327/142, 143
See application file for complete search history.

(56) References Cited

U.S. PATENT DOCUMENTS

| 4,254,347 A | * | 3/1981 | Ray ........................ 327/143 |
| 4,481,427 A | * | 11/1984 | Suzuki et al. ............ 326/128 |
| 5,323,067 A | * | 6/1994 | Shay ....................... 327/142 |
| 6,097,225 A | * | 8/2000 | Smith ...................... 327/143 |

OTHER PUBLICATIONS

Pan et al, Mixed Signal Validation of the Intel Pentium 4 Microprocessor Power-up Sequence, 2003 IEEE, pp. 163-166.*
Lattice Semiconductor Corporation, ispPAC-POWR604 Data Sheet, pp. 1-29, ©2004.
Lattice Semiconductor Corporation, ispPAC-POWR1208 Data Sheet, pp. 1-34, ©2004.

* cited by examiner

*Primary Examiner*—Thomas Lee
*Assistant Examiner*—Suresh K Suryawanshi
(74) *Attorney, Agent, or Firm*—Jonathan Hallman; MacPherson Kwok Chen & Heid

(57) ABSTRACT

A method and apparatus is provided to power-up a device having both digital and analog circuitry. The analog circuitry requires a stabilization period before proper operation. During power-up, the digital circuitry is held in reset by a power-on reset circuit. The power-on reset circuit releases the reset after the expiration of a power-on reset period. During the period of time after expiration of the power-on reset period and before the analog circuitry reaches equilibrium, the digital circuitry operates in a mode that does not require input signals from the analog circuitry. After the analog circuitry has reached equilibrium, the digital circuitry begins normal operation during which inputs signals from the analog circuitry may be processed by the digital circuitry.

20 Claims, 2 Drawing Sheets

POWERING-UP A DEVICE HAVING DIGITAL AND ANALOG CIRCUITRY

TECHNICAL FIELD

The present invention relates generally to devices including digital and analog circuitry, and more particularly to powering up a device that includes digital and analog circuitry.

BACKGROUND

As circuit complexities increase, a mixed type of circuit has evolved which integrates a digital core with analog circuitry. The digital core may comprise programmable logic circuitry, a microprocessor, or a finite state machine among other things. The analog circuitry includes comparators and digital-to-analog or analog-to-digital converters. For example, programmable power sequencers have been developed that contain a programmable logic core comprising a programmable AND array. The programmable AND array is integrated with comparators whose outputs are required by the AND array to properly control the power sequencing of devices.

As is common with digital systems, the programmable logic core includes synchronous devices such as flip-flops that must be powered-up in a particular binary state denoted as reset. Accordingly, digital systems typically include a power-on reset (POR) circuit that senses the onset of power during a power-up of the system from an off state or from an on state in which the power has fluctuated below an operating threshold. The POR circuit responds by asserting a reset signal for a predetermined or variable period of time, which may be denoted as the POR period. Typically, a POR circuit includes a Schmitt trigger or some other hysteresis device to control the assertion of the reset signal. Given the presence of a POR circuit, the digital devices that must be in reset upon being powered-up are protected from "waking up" into rogue, unpredictable states. Without a POR circuit, these rogue binary states cause malfunctions, glitches, and other undesirable effects. During the POR period, input/output terminals to the device are typically tri-stated (driven into a high impedance state).

Assuring the performance of synchronous digital circuitry is not the only concern during power-up in a mixed digital/analog device such as a programmable power sequencer. The analog circuitry may also require a stabilization period after power-on before proper operation is reached. For example, a voltage reference such as from a bandgap reference requires a stabilization period alter power-on (or equivalently, an equilibrium period). As is known in the art, a bandgap reference provides a reference voltage that depends upon two voltages having opposing temperature dependencies. One voltage increases with increasing temperature whereas the other voltage decreases with increases increasing temperature. By properly compensating these voltages, the bandgap reference provides a reference voltage that is stable with respect to temperature. Bandgap references include a differential amplifier that responds to the difference between the voltages with the opposing temperature dependencies. In turn, the output of the differential amplifier controls the compensation of these same voltages within a negative feedback loop. This feedback loop takes time to settle and reach equilibrium. The amount of time necessary for equilibrium may be denoted as the bandgap period. Additional time may be required for other reasons such as settling time on output filters or buffers to allow them to reach their requisite accuracy.

Although the bandgap period and the POR period begin at the onset of power-up and run concurrently, they may be dramatically different in length. The length of the POR period will generally depend upon how much time it takes for VCC to become stable as supplied by the corresponding power supply. The VCC voltage may rise fairly rapidly, often around 0.5 volts per micro-second ($\mu$sec). Accordingly, the POR period will comprise a certain number of micro-seconds, for example 100 $\mu$secs. On the other hand, because the bandgap period depends upon the time required to stabilize a reference voltage, the bandgap period will typically be substantially longer, ranging from a few to as many as ten milliseconds (msecs). To assure proper functioning of both the digital and analog circuitry, the POR period for a mixed digital/analog circuit such as a programmable power sequencer is typically extended to be sure the bandgap period is satisfied before releasing the reset signal. Recall that the input/output terminals (also denoted simply as "inputs" or "outputs") of the device are tri-stated during the reset period. This leads to a problem in that the input/output terminals may be pulled either high or low by external devices during this extended reset period. Upon release of the reset signal, an input or output may thus be in an unexpected rogue binary state, thereby causing glitches and malfunctions. Moreover, this problem will also be encountered should the analog circuitry comprise something other than a reference voltage source so long as the period needed to stabilize the analog circuitry is long enough to allow tri-stated inputs or outputs to be pulled by external devices into unexpected binary states. For example, waiting for calibration of analog circuitry or offset cancellation procedures may also create a disparity between the POR period and the readiness of the analog circuitry.

Accordingly, there is a need in the art for improved power-up techniques for mixed digital/analog circuits.

SUMMARY

In accordance with one aspect of the invention, a device including a digital core coupled to analog circuitry is provided. The device includes: a reset circuit configured to assert a reset signal to the digital core for a reset period; and a flag generation circuit, wherein the flag generation circuit is configured to assert a flag signal to indicate that the analog circuitry has stabilized, and wherein the digital core has a first mode of operation in which the digital core does not respond to signals from the analog circuitry and a second mode of operation wherein the digital core does respond to signals from the analog circuitry, the first mode of operation being invoked after the expiration of the reset period and the second mode of operation being invoked after the flag signal has been asserted.

In accordance with another aspect of the invention, a method is provided for powering-up a device having a digital core configured to receive signals whose generation requires a stable analog reference voltage. The method includes the acts of: in response to an onset of power-on for the device, asserting a reset signal to the digital core; in response to a release of the reset signal, configuring the digital core into a first mode of operation, wherein the digital core does not respond to the signals requiring the stable analog reference voltage while in the first mode; signaling the digital core that the analog reference voltage has stabilized after the onset of power-on for the device; and in response to the signaling of the digital core, configuring the digital core into a second mode of operation, wherein the digital core responds to the signals requiring the stable analog reference voltage while in the second mode.

In accordance with another aspect of the invention, a programmable power sequencer is provided. The sequencer includes:,at least one comparator configured to monitor input voltages with respect to an analog voltage reference; programmable logic circuitry configurable to control the power sequencing of external devices in response to receiving outputs from the at least one comparator; a power-on reset (POR) circuit configured to assert a reset signal to the programmable logic circuitry for a POR period in response to a power-on of the power sequencer; and a flag generation module configured to assert a flag to the programmable logic circuitry to indicate that the analog voltage reference has stabilized in response to power-on of the power sequencer.

BRIEF DESCRIPTION OF THE DRAWINGS

Use of the same reference symbols in different figures indicates similar or identical items.

DETAILED DESCRIPTION

To solve the problem of glitches upon release of the reset signal in mixed devices having both analog and digital circuitry, a mixed signal device is provided in which the power-up of the digital core and associated analog circuitry are decoupled. In this mixed device, the length of time after which the reset signal may be released (the POR period) may be based solely upon the demands of the digital core. Thus, the POR period may be determined by the appropriate stabilization of the power supply voltage necessary for proper operation of the digital core. A new signal, which may be denoted as an "analog good" flag, is asserted by the mixed device when necessary analog circuits such as an analog reference voltage source has reached equilibrium. The analog reference voltage source may comprise a bandgap reference or another suitable source. Regardless of the type of analog circuitry that must be stabilized or reach equilibrium in the mixed device, the length of time necessary for this stabilization upon the onset of power-up will be such that digital output terminals for the mixed device may be pulled by external devices into unexpected binary states should the digital core remain in reset during the analog circuitry stabilization period. To prevent this unwanted effect, the digital core is configured with a specialized mode of operation invoked after release of the reset signal and before the analog good flag has been asserted. Although the reset signal may have been released, until the analog good flag has been asserted, the digital core is configured in this specialized mode of operation to ignore or not use signals generated by the analog circuitry that depend upon the analog stabilization. For example, should the analog circuitry comprise an A/D converter, the digital core would be configured to not initiate activity which requires any outputs from the A/D converter while in the specialized mode of operation. To prevent the glitches discussed with respect to the outputs, the digital core releases the tri-state and configures its outputs into known states during this specialized mode of operation.

Figure 1:
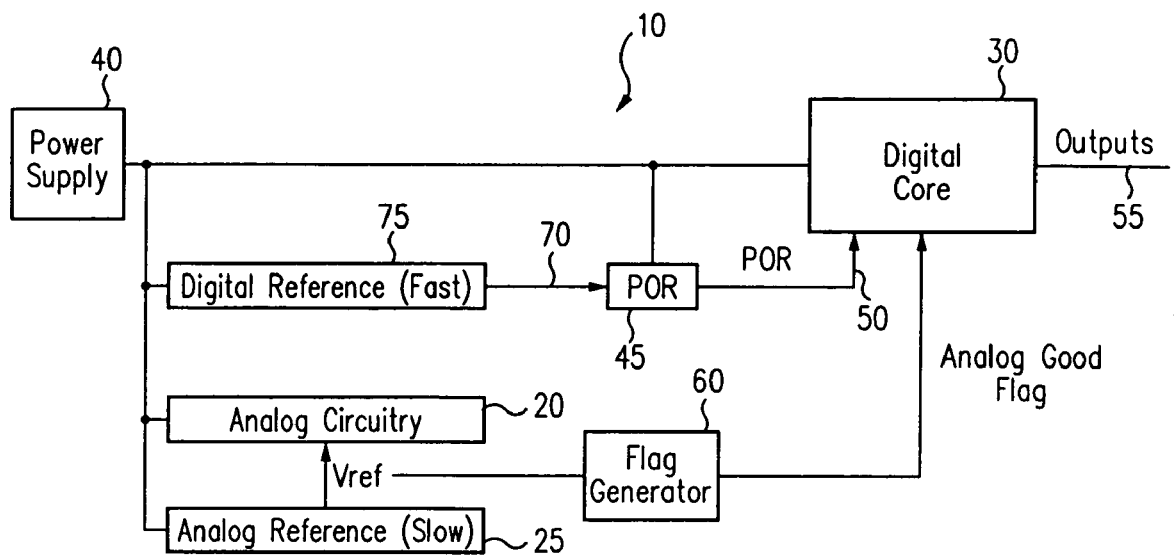
FIG. 1 is a block diagram of a mixed digital/analog device according to one embodiment of the invention.

Referring now to the drawings, a mixed device 10 in accordance with one embodiment of the invention is shown in FIG. 1. In this embodiment, analog circuitry 20 comprises any analog circuitry requiring the use of an analog reference $V_{ref}$ provided by an analog reference circuit 25. Analog reference circuit 25 may comprise a bandgap reference such that $V_{ref}$ is a bandgap reference voltage. In alternative embodiments, however, analog circuitry 20 need not depend upon a bandgap reference. Thus, although the following discussion will assume that analog circuitry 20 requires an analog reference voltage, it will be appreciated that analog circuitry 20 merely requires a stabilization period such as that required for calibration that is longer than the POR period. Digital core 30 may comprise a programmable logic circuit, a finite state machine, a microprocessor, or any other digital circuitry that will process signal(s) from analog circuitry 20 after power-up. Both digital core 30 and analog circuitry 20 may be powered by a power supply 40.

After the onset of the power-up of mixed device 10 (which can occur from an off state or from an on state in which the power has fluctuated below an operating threshold), a number of processes occur. For example, a power-on reset (POR) circuit 45 keeps digital core 30 in reset through the assertion of a reset signal 50 in response to the onset of power-up. POR circuit 45 de-asserts reset signal 50 after power supply 40 has produced a stable VCC voltage suitable for proper operation of the digital core 30 such that digital core 30 has stabilized in response to receiving VCC. The construction of a suitable POR circuit 45 is well-known and typically involves the use of a Schmitt trigger or other hysteresis device. Also in response to the onset of power-up, analog reference circuit 25 begins the generation of the analog voltage reference, $V_{ref}$. Analog reference circuit 25 is configured such that the amount of time required for $V_{ref}$ to reach equilibrium is greater than the POR period. For example, should $V_{ref}$ be a bandgap reference voltage, its production involves the stabilization of a feedback loop as discussed earlier. This stabilization typically requires a few to as much as tens of milliseconds whereas the POR period is typically less than 100 μsecs. The period of time required for $V_{ref}$ to reach equilibrium may be denoted as the analog reference period. It will be appreciated, however, that the lengths of the POR period and the analog reference periods are arbitrary.

Digital core 30 cannot perform certain operations until the analog reference period expires because these operations require output signal(s) from analog circuitry 20. In turn, these output(s) depend upon the validity of $V_{ref}$. To prevent glitches or other malfunctions in a set of output signals 55 from digital core 30 that would be caused by keeping digital core 30 in reset over the excessive extent of the analog reference period, digital core 30 includes a specialized mode of operation that is invoked after the reset signal 50 is released. Digital core 30 continues to operate in this specialized mode until the analog reference period has expired. Because any signals from analog circuitry 20 which depend upon $V_{ref}$ cannot be trusted as accurate until $V_{ref}$ reached equilibrium, digital core 30 is configured to disregard and not depend upon these signals while in the specialized mode. Thus, this specialized mode may be denoted as a digital-only mode. During the digital-only mode, digital core 30 may configure outputs 55 appropriately. Recall that during reset, outputs 55 are tri-stated. By configuring outputs 55 as needed during the digital-only mode, digital core 30 prevents glitches or other malfunctions that could occur should outputs 55 remain tri-stated until $V_{ref}$ has reached equilibrium.

To allow digital core 30 to sense when $V_{ref}$ has stabilized, device 10 includes a flag generation module 60 that asserts an "analog good" flag upon stabilization of $V_{ref}$. Although shown separately from analog reference circuit 25, flag generation module 60 may be integrated with this circuit. Flag generation, module 60 may be as simple as a timer or may comprise circuitry that, for example, indicates when a necessary calibration or offset calibration process has been completed. Digital core 30 is configured to respond to the assertion of the analog good flag by switching from the digital mode into normal operation. In normal operation, signals provided by analog circuitry 20 may be relied upon and used by digital core 30. For example, if digital core 30 comprises a microprocessor, a user would alter its program code to accommodate both the digital mode and the normal mode of operation. Alternatively, these modes could be factored into the state machine being implemented should digital core 30 comprise programmable logic circuitry or a finite state machine.

Digital core 30 may require a digital voltage reference 70 provided by a digital reference source 75 for proper operation. Unlike $V_{ref}$, digital voltage reference 70 need not be as precise and thus may be generated by digital reference source 75 relatively quickly. Should digital voltage reference 70 be required by digital core 30, POR circuit 45 could be modified to detect digital voltage reference 70 before releasing reset signal 50.

Figure 2:
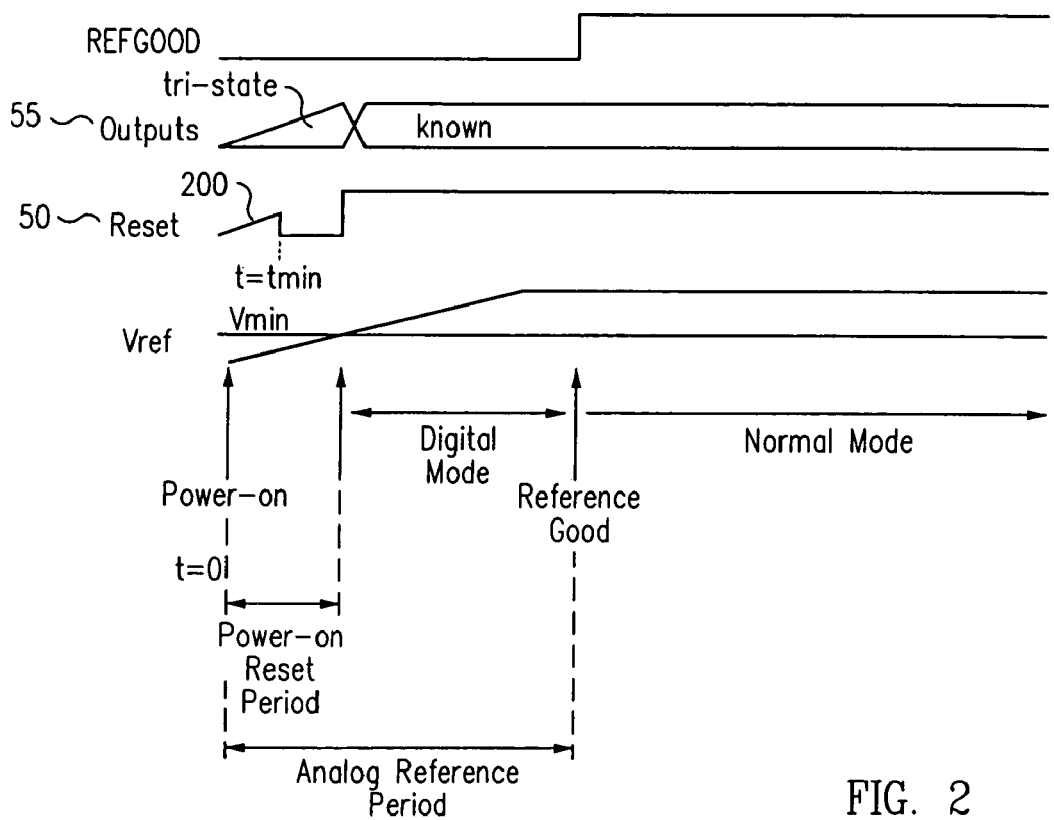
FIG. 2 is a timing diagram for various signals used in the mixed digital/analog device of FIG. 1.

The behavior of device 10 may be better understood with reference to the timing diagram illustrated in FIG. 2. At time zero, power supply 40 (FIG. 1) may respond to a signal from digital core 30 and begin supplying VCC to device 10. As VCC increases towards stabilization, $V_{ref}$ will also increase until it reaches equilibrium. As $V_{ref}$ stabilizes, POR circuit 45 must wait until it receives sufficient power to assert reset signal 50. This waiting period is illustrated in FIG. 2 for reset signal 50 by an initial ramping stage 200. When POR circuit 45 has sufficient power at a time denoted a $t_{min}$, it mat assert reset signal 50 (which may be active low or active high). The assertion of reset signal 50 is eventually released at the end of the POR period. During the POR period, outputs 55 are tri-stated and thus may be pulled into unknown binary states by external devices as discussed previously should the POR period be extended unnecessarily. Thus, after release of reset signal 50, outputs 55 are configured into known binary states by digital core 30 may begin. The digital mode of operation occurs between the release of reset signal 50 and the assertion of the analog good flag. As can be seen from inspection of FIG. 2, outputs 55 would remain in unknown binary states substantially longer but for the existence of the digital mode. In this fashion, glitches and other malfunctions are substantially reduced or eliminated.

Figure 3:
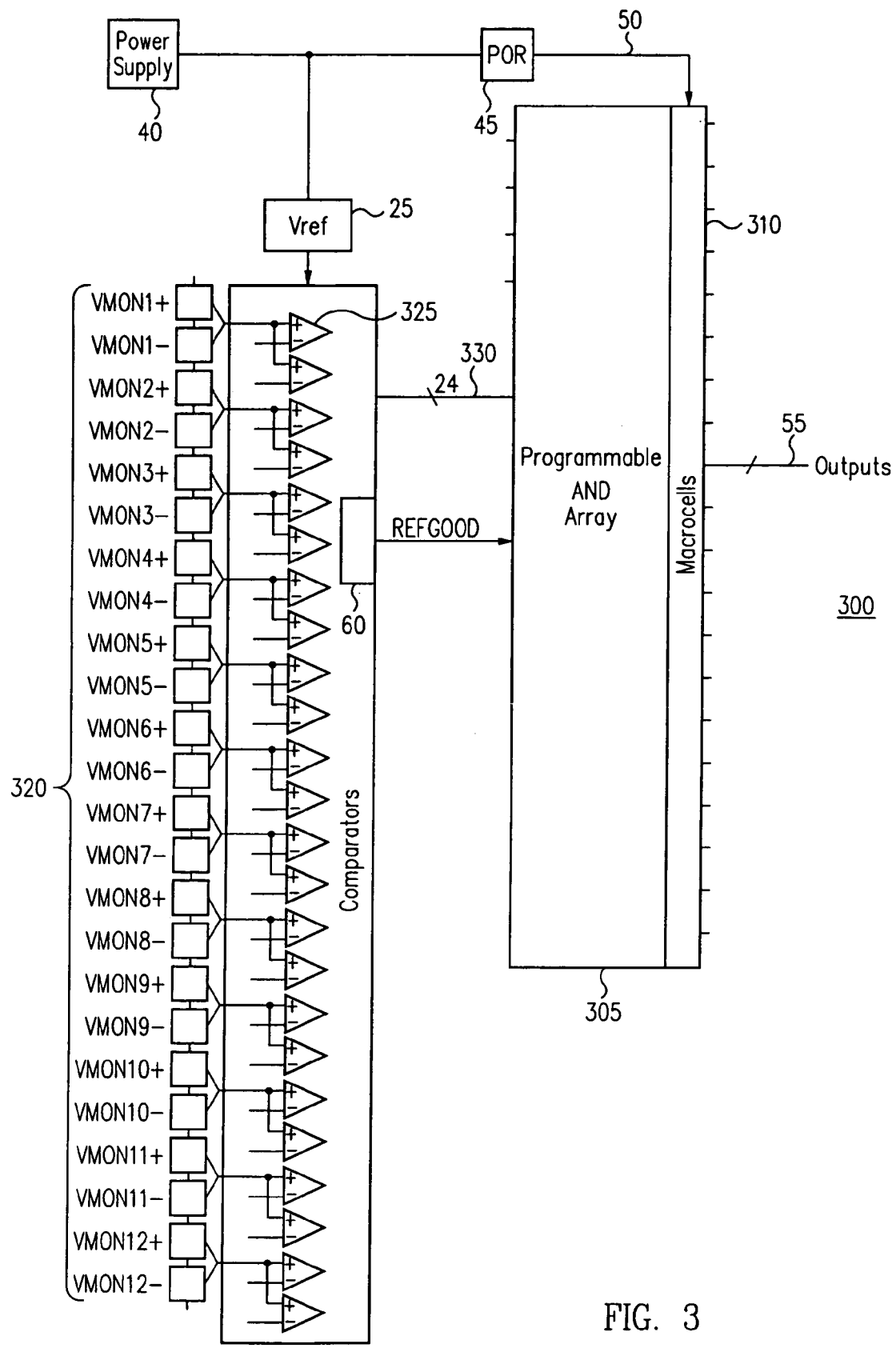
FIG. 3 is a block diagram of a programmable power sequencer configured according to one embodiment of the present invention.

As discussed previously, digital core 30 may comprise programmable logic circuitry such as, for example, that used in a CPLD or an FPGA. A programmable logic embodiment is illustrated in FIG. 3 for a programmable power sequencer 300. The programmable logic circuitry comprises a programmable AND array 305 that provides product term and sum of product term outputs to macrocells 310. Programmable power sequencer 300 monitors voltage inputs 320 through analog circuitry comprising comparators 325. Comparators 325 operate by comparing voltage inputs 320 to a bandgap voltage reference from voltage reference 25. Power-on reset circuit 45 monitors the supply voltage from power supply 40 as discussed with respect to FIG. 1. Macrocells 310 receive a reset signal from power-on reset circuit 45 during the POR period. By performing the appropriate logic on outputs 330 from comparators 325, programmable AND array 305 adjusts outputs 55 from macrocells 310 accordingly to effect the desired power sequencing of external devices (not illustrated). However, programmable AND array 305 is configured to not perform this logic until the programmable logic circuitry receives an analog good flag (here denoted as REFGOOD) from flag generation module 60. The assertion of REFGOOD by flag generation module 60 indicates that the bandgap reference has stabilized such that outputs 330 from comparators 325 may be relied upon. Once REFGOOD has been asserted, programmable AND array. 305 may begin normal operation. Prior to the assertion of REFGOOD and after the ending of the POR period, programmable AND array 305 is configured to be in the digital mode of operation as discussed with respect to FIG. 1.

The above-described embodiments of the present invention are merely meant to be illustrative and not limiting. It will thus be obvious to those skilled in the art that various changes and modifications may be made without departing from this invention in its broader aspects. Accordingly, the appended claims encompass all such changes and modifications as fall within the true spirit and scope of this invention.

We claim:

1. A device including a digital core coupled to analog circuitry, comprising:
    a reset circuit configured to assert a reset signal to the digital core for a reset period; and
    a flag generation circuit, wherein the flag generation circuit is configured to assert a flag signal to indicate that the analog circuitry has stabilized, and wherein the digital core has a first mode of operation in which the digital care does not respond to signals from the analog circuitry and a second mode of operation wherein the digital core does respond to signals from the analog circuitry, the first mode of operation being invoked after the expiration of the reset period and the second mode of operation being invoked after the flag signal has been asserted.

2. The device of claim 1, wherein the reset circuit is a power-on reset (POR) circuit.

3. The device of claim 2, further comprising:
    a digital voltage reference source adapted to provide a digital voltage reference to the digital core, wherein the digital voltage reference source is adapted such that the digital voltage reference reaches equilibrium before the analog circuitry reaches equilibrium.

4. The device of claim 2, wherein the POR circuit is configured to assert the reset signal in response to power-on of the device, and wherein the flag generation circuit is configured to assert a flag signal when the analog circuitry has stabilized in response to power-on of the device.

5. The device of claim 4, further comprising:
    an analog reference circuit configured to provide an analog reference voltage to the analog circuitry, wherein the analog circuitry stabilizes in response to the stabilization of the analog reference voltage.

6. The device of claim 5, wherein the analog reference circuit is a bandgap reference circuit, and wherein the analog reference voltage is a bandgap reference voltage produced by the bandgap reference circuit.

7. The device of claim 1, wherein the digital core comprises programmable logic circuitry.

8. The device of claim 1, wherein the analog circuitry comprises a comparator.

9. The device of claim 1, wherein the digital core comprises a microprocessor.

10. The device of claim 1, wherein the digital core comprises a finite state machine.

11. A method of powering-up a device having a digital core configured to receive signals whose generation requires a stable analog reference voltage, comprising:
in response to an onset of power-on for the device, asserting a reset signal to the digital core;
in response to a release of the reset signal, configuring the digital core into a first mode of operation, wherein the digital core does not respond to the signals requiring the stable analog reference voltage while in the first mode;
signaling the digital core that the analog reference voltage has stabilized after the onset of power-on for the device; and
in response to the signaling of the digital core, configuring the digital core into a second mode of operation, wherein the digital core responds to the signals requiring the stable analog reference voltage while in the second mode.

12. The method of claim 11, wherein signaling the digital core that the analog reference voltage has stabilized comprises asserting a flag signal to the digital core.

13. The method of claim 11, further comprising:
tri-stating outputs of the device during the assertion of the reset signal.

14. The method of claim 13, further comprising:
releasing the tri-stated outputs; and
configuring the outputs into known binary states while the digital core is in the first mode of operation.

15. The method of claim 11, wherein the analog reference voltage is a bandgap reference voltage.

16. The method of claim 11, wherein the digital core comprises programmable logic circuitry.

17. A programmable power sequencer, comprising:
at least one comparator configured to monitor input voltages with respect to an analog voltage reference;
programmable logic circuitry configurable to control the power sequencing of external devices in response to receiving outputs from the at least one comparator;
a power-on reset (POR) circuit configured to assert a reset signal to the programmable logic circuitry for a POR period in response to a power-on of the power sequencer; and
a flag generation module configured to assert a flag to the programmable logic circuitry to indicate that the analog voltage reference has stabilized in response to power-on of the power sequencer.

18. The programmable power sequencer of claim 17, wherein the programmable logic circuitry comprises a programmable AND array and a plurality of macrocells, the macrocells being configurable to be reset by the reset signal.

19. The programmable power sequencer of claim 18, wherein the analog voltage reference is a bandgap reference.

20. The programmable power sequencer of claim 18, wherein the programmable logic circuitry is configured to have a first mode of operation after the POR period has expired and to have a second mode of operation after the flag has been asserted, the programmable logic circuitry being configurable to respond to the outputs from the at least one comparator only in the second mode of operation, and wherein the programmable AND array is operable to configure outputs of the programmable power sequencer into predetermined states during the first mode of operation.

* * * * *